Jan. 23, 1968   N. POLSKY   3,364,599
EDUCATIONAL DEVICE FOR TEACHING TIME
Filed July 30, 1965   4 Sheets-Sheet 2

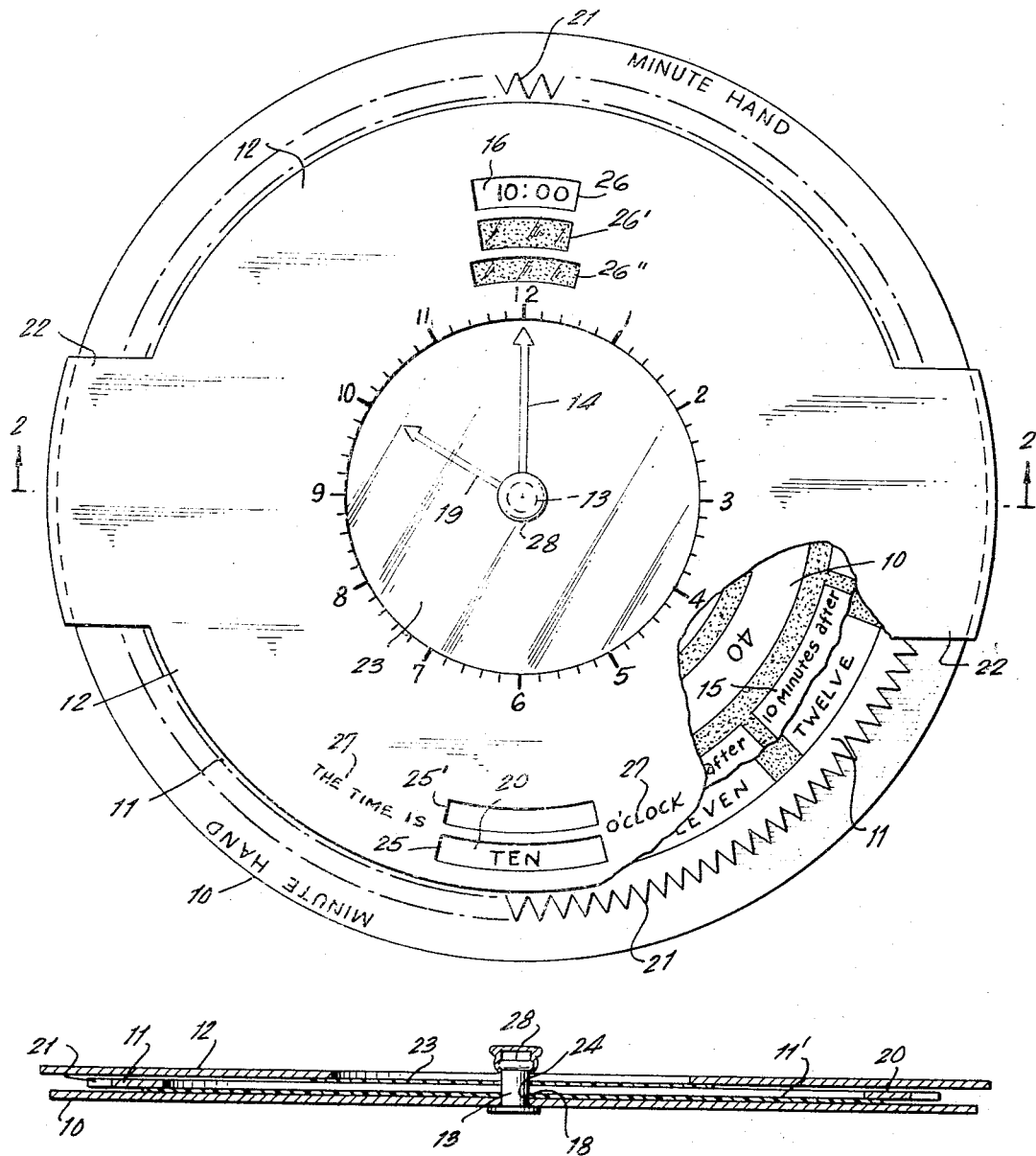

INVENTOR.
NATHAN POLSKY
BY Jacobs & Jacobs
ATTORNEYS

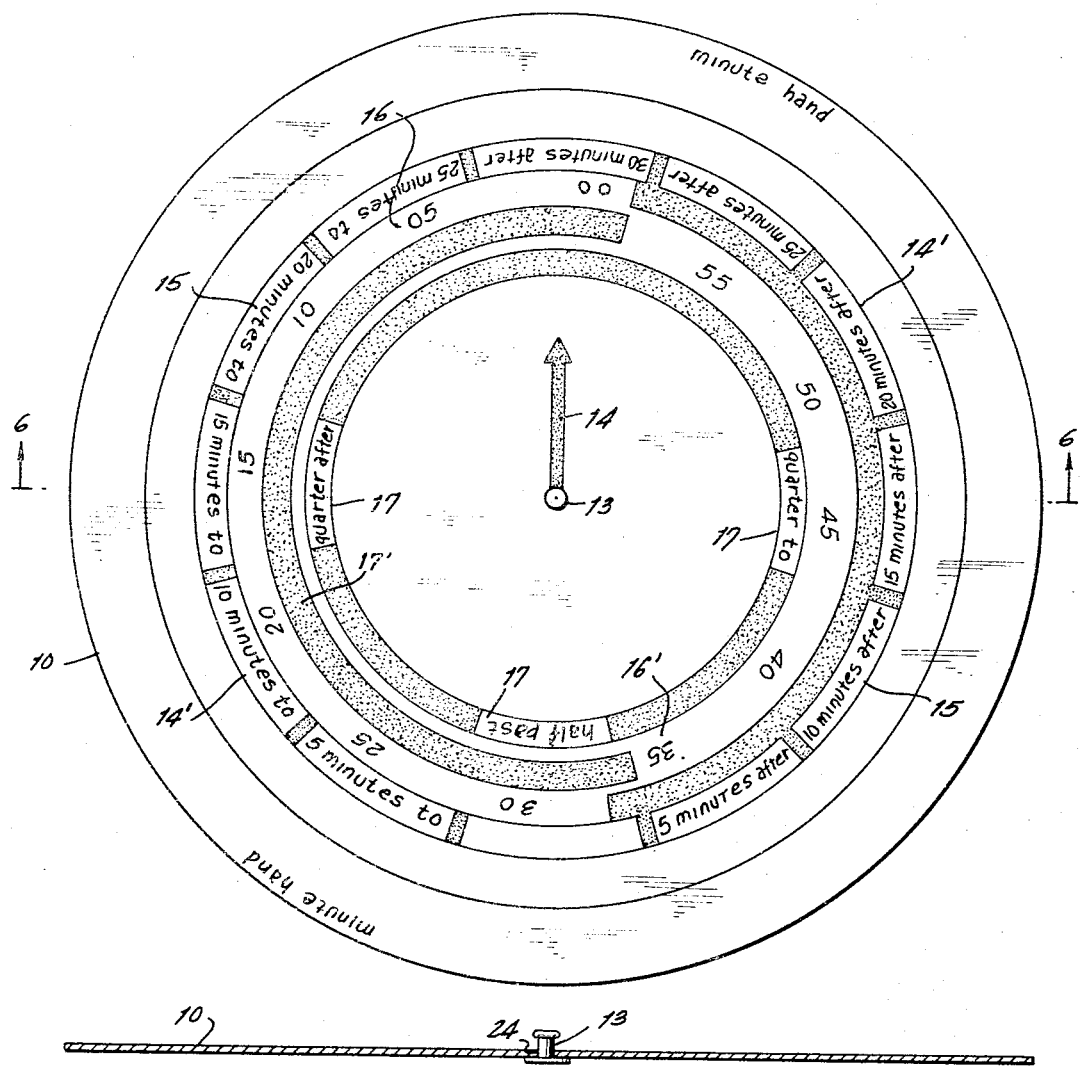

Jan. 23, 1968  N. POLSKY  3,364,599
EDUCATIONAL DEVICE FOR TEACHING TIME
Filed July 30, 1965  4 Sheets-Sheet 4

INVENTOR.
NATHAN POLSKY
BY Jacks & Jacks
ATTORNEYS

United States Patent Office 3,364,599
Patented Jan. 23, 1968

3,364,599
EDUCATIONAL DEVICE FOR TEACHING TIME
Nathan Polsky, 239 Windsor Ave., Rockville
Centre, N.Y. 11570
Filed July 30, 1965, Ser. No. 476,014
2 Claims. (Cl. 35—39)

This invention relates to an educational device for teaching children how to tell time and, more particularly, a visual aid device which can be used for practice and instructive purposes and which is capable of being set to indicate in a plurality of ways any time of day within five minute intervals.

An object of the present invention is to provide a time teaching or time telling device especially designed for use by children and wherein a combination of cooperating elements having transparent portions and complementary indicia are axially connected in relatively rotatable manner.

It is another object of the present invention to provide a uniquely constructed, versatile educational device for visually teaching time in a manner which can be understood even by relatively young children and which gives them the opportunity to manipulate the various portions of the device and to learn to tell or recognize time both with relation to a clock dial and in words and numerals.

In the accompanying drawing, wherein a preferred embodiment of the invention has been illustrated:

FIGURE 1 is a face view of the new educational device for teaching time in assembled conditions but with certain overlying portions broken away to reveal the underlying construction and illustrating the time setting of 10 o'clock;

FIGURE 2 is a transverse cross-sectional view taken on line 2—2 of FIGURE 1;

FIGURE 5 is a face view of the minute hand lowermost element of the new device;

FIGURE 6 is a transverse cross-sectional view taken on line 6—6 of FIGURE 5;

Figure 3:
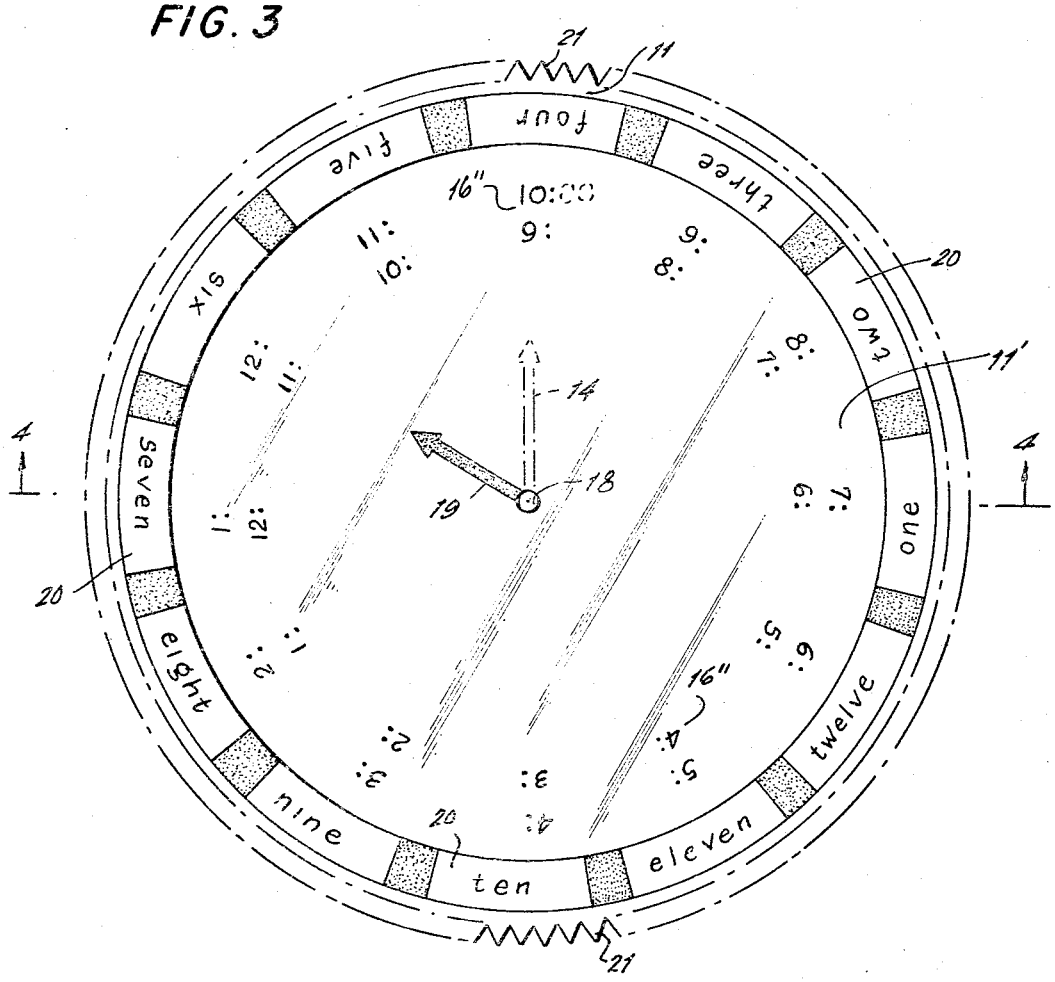
FIGURE 3 is a face view of the hour hand intermediate element with a transparent central portion forming a part of the present device.
Figure 4:
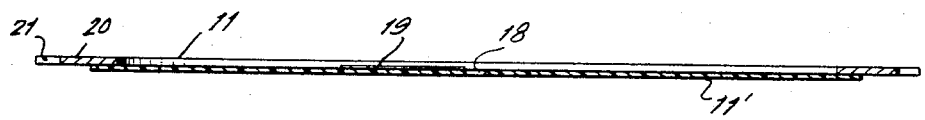
FIGURE 4 is a transverse sectional view taken along line 4—4 of FIGURE 3.

The new educational device according to the present invention is made up of three disc shaped elements 10, 11 and 12 arranged in superposed axially connected position and each of which is relatively rotatable with respect to the other two disc shaped elements in order that a wide variety of settings can be effected. One of the essential and important features of the present invention is to provide an intermediate element which is transparent except for its peripheral portion for a purpose to be explained hereinafter. It is also an important part of the present invention to provide the lowermost and intermediate disc shaped elements with positionally fixed hour and minute hands, respectively, which move only with movements of the elements themselves so that the minute and hour hands cannot be inadvertently moved to a non-significant or incorrect position.

The lowermost disc shaped element 10, illustrated in FIGURE 5, sometimes hereinafter for convenience called the minute hand element, is composed of cardboard, heavy paper or other suitable opaque material and is provided with the legend "minute hand" in a plurality of spaced locations near the peripheral edge of the element and this legend is preferably imprinted at the positions shown in FIG. 5. The minute hand element 10 is also provided inwardly of its peripheral edge as shown in FIGURE 5 with a plurality of concentric circles or semi-circles of adhesively secured paper or applied by printing or other process and at the axial center of the element there is a stud or the like 13 and a (colored) minute hand 14 affixed to or printed on the surface of the element and extending radially from said stud. Thus, inwardly of the periphery of the element 10 there is a concentric strip 14' with wording indicia 15 thereon indicating in 5-minute intervals the time relative to any hour and whether the number of minutes so designated are before the hour or after the hour. Radially, inwardly thereof there are provided a pair of semi-circular radially off-set numeral marking strips 16 and 16' reading from 00 to 55 in 5-minute intervals and radially inwardly thereof are disposed circular and arcuate segmental members 17 and 17', the former having the legends "quarter-to," "half-past" and "quarter-after" spaced thereon and the latter being a blank semi-circular strip or band unmarked thereon and extending between the 35 and the 55 indicia of the offset portion of band 16'. It is pointed out that the minute hand 14 is affixed to the underlying member as by an adhesive or printed thereon and always points to "00."

The intermediate disc 11 illustrated in FIGURE 3, is composed of a suitable transparent material such as a synthetic plastic 11' on which are marked radially aligned pairs of numerals 16" differing from one another by only one and the higher numeral (relative to time of day) of each pair being further outwardly on the plastic material than the lower numeral of each such pair. At the axial center there is an opening or aperture 18 adapted to fit over the stud 13 on the minute hand element 10 and an hour hand 19 is affixed to the surface of the element or printed thereon and extends radially outwardly from said opening or aperture and is always directed toward the word "six" on the circular border 20 on which each of the twelve hours appears in wording. The intermediate element is provided at 21 with a saw tooth or serrated peripheral edge of an opaque circular band by means of which the element can be readily rotated to any desired extent, either in a clockwise or in a counter-clockwise direction; this edge may be provided with any other die cut shape or provided with a smooth edge.

The uppermost disc-shaped element 12, which may be provided with extensions 22 in the 3 and 9 o'clock positions to permit ease in holding the entire device while the user rotates the discs, is composed of a suitable material such as plastic, cardboard, heavy paper or like material, which is centrally cut out and provided with a transparent central portion 23 which has an aperture or opening 24 to fit over the stud 13 in the minute hand element 10 and bordering this central cut out portion of the uppermost element there are markings showing the hours from 1 to 12 in the manner of a clock dial and also "minute" line indicia and a set of generally rectangular, slightly arcuate apertures 25, 25' and 26, 26' and 26" in the 6 and 12 o'clock positions and these openings coincide or register with word and numeral time indicia on the intermediate and lower elements. Adjacent the "6 o'clock" openings 25, 25' the uppermost element 12 is provided with suitable wording 27 as shown in FIG. 1. The uppermost element 12 may optionally be provided with markings between the hours to indicate minutes but in the preferred embodiment of the invention as illustrated in the drawings, it is primarily the intention to teach and indicate time only within 5-minute intervals, especially when the device is used by or demonstrated to very young children.

When the three elements are assembled, as is shown in FIG. 1 for example, there is a removable complementary cap 28 which fits over the stud 13 and which maintains the assembly of the three elements without, however, preventing or unduly impeding desired relative rotation of the elements. Depending upon the nature of the plastic material used for the central portions of the intermediate and uppermost elements, it may be desirable to apply on the underside thereof around the axial apertures thereof a small, adhesively secured, transparent reinforcing disc (not illustrated) which protects the axial openings against undesirable enlargement or distortion and which also resists radial cracks or tears resulting from repeated use or in the event that the various elements are assembled and disassembled a considerable number of times.

Stud 13 may also be any suitable fastening device or brad designed to hold together the three discs and permit their independent rotation and may be permanently positioned.

Figure 8:
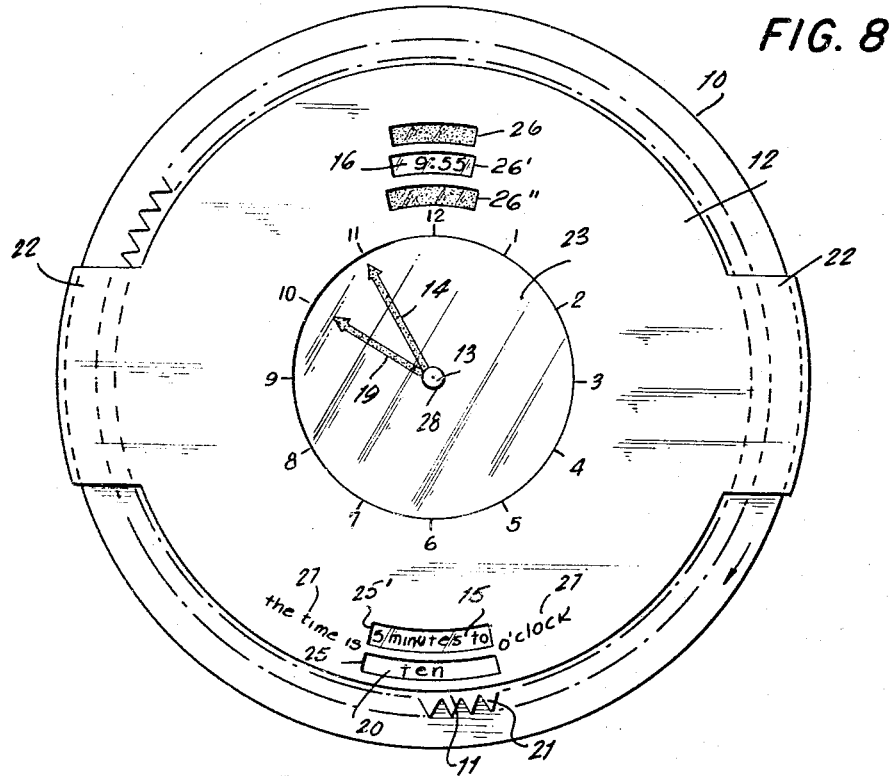
FIGURE 8 is a view similar to FIGURE 7 but showing a different time setting at 9:55 o'clock.
Figure 7:
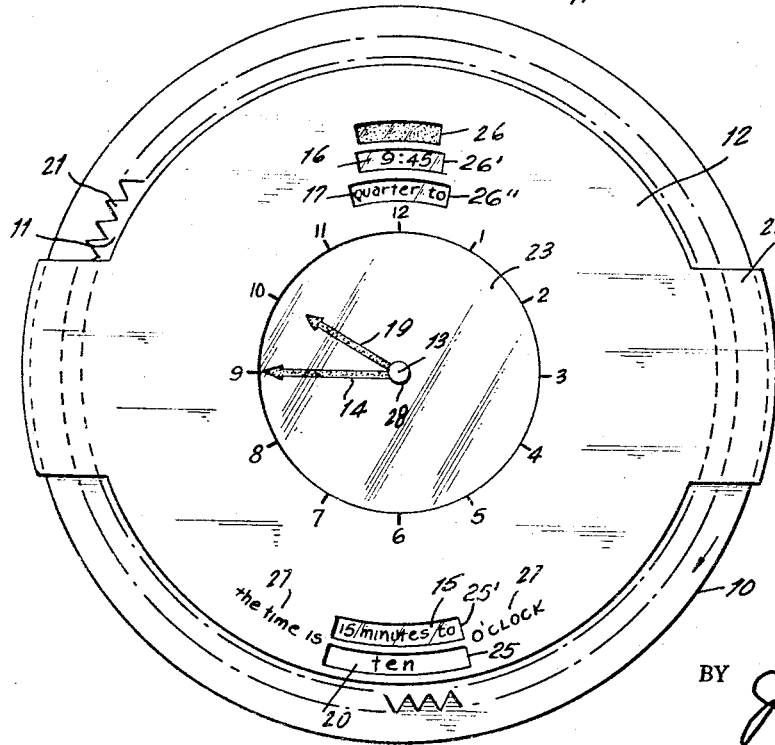
FIGURE 7 is a face view looking at the uppermost element of the new device and showing portions of the underlying elements in one setting of the elements at 9:45 o'clock.

It will be appreciated from the foregoing that the three disc shaped elements are relatively rotatable with respect to one another in a clock-wise or counter-clockwise direction in order to provide a wide variety of settings. In setting the device to a particular hour the lowermost and uppermost elements are lightly held by the fingers of the user in fixed relationship and the intermediate disc is turned by its serrated edge in a clock-wise or counter-clockwise direction, thereby moving the hour hand to any desired position. By holding the intermediate and uppermost elements lightly in fixed relationship and rotating the lowermost element in a clock-wise or counter-clockwise direction the minute hand is moved to the desired position and thus manipulations can be carried out at will and for instructional or teaching purposes and the various relative settings of the elements show the time not only by the hour and minute hands, but the time is confirmed both by numerals and words through the cut-outs or openings in the uppermost element. This also serves as a check upon a correct setting and if all the indicia relating to the time do not agree, then it is clear that the elements have been incorrectly manipulated or set and the child or instructor will make the necessary adjustments or corrections so that all the indicia match. It will be seen that the device is very versatile and makes it possible to learn to tell time or to set the device to any desired time and to check up on whether the manipulations have been properly carried out. In addition, the numerals and words which appear in a coordinated, direct correlation with the minute and hour hands serve to reinforce the "time" concept in three important and basic ways: "pictorially" by the positioning of the "hand" elements; verbally by the appearance of the word designations (with the added instruction value of showing the spelling of the words relating to numbers); and via the appearance of the proper numeral designations of time, such as 9:05, 10:20, 11:00, etc. Thus, reverting to FIG. 1, for example, it will be seen that the "clock" hands are set to 10 o'clock, that the number "10:00" appears in the opening 26 radially outermost of the "clock" dial and the word "ten" appears in the opening radially outermost from the numeral 6 on the "clock" dial. By comparing FIG. 1 with FIG. 8, it will be seen that when the elements have been set to a different time, i.e., 9:55, appropriate numbers and wording are visible in the openings in the uppermost element and that all indicia agree. A further setting of 9:45 is shown in FIG. 7 and from these three illustrative settings of the elements of the device it will be appreciated that a great variety of settings is possible but that when the three elements are correctly moved with respect to one another, all indicia agree and confirm each other.

It should be noted that an important contribution of the present invention is the fact that all settings of the clock hands, and appearance of appropriate numbers and wordings are visible on a single (the *front*) plane of the device simultaneously.

The numeral time in five-minute indicia intervals will appear in the upper opening 26 if the time as shown by the clock hands is positioned in an "after the hour" setting and will appear in the center opening 26' if the time as shown by the clock hands is positioned in a "before the hour" setting.

Certain time idioms will appropriately appear in the lower opening 26" such as "quarter after," "quarter to" and "half past."

The principle of the transparent (or partially transparent) intermediate and top discs (or more) (together with an opaque lower disc) in rotatable relationship may be usefully applied to a variety of other purposes in which a similar information-seeking or problem-solving result is desired.

I claim:

1. An educational device for teaching time comprising in combination lowermost, intermediate and uppermost disc-shaped elements axially mounted for a plurality of relatively rotatable correlatable time-telling relationships, the lowermost element being opaque, the intermediate element being transparent except for its peripheral portion and the uppermost element having a central transparent portion, the lowermost element having spaced minute hand wording indicia thereon near its outer edge and disposed thereon radially inwardly in succession:

a circular band of spaced time designations indicating in 5-minute wording time intervals the relationship to, before and after any hour of the day and which time designations are visible through an arcuate cut-out in the uppermost element in the 6 o'clock position thereof, an offset circular band of time designating numerals from 00 to 55 in 5-minute intervals visible through an arcuate cut-out in the uppermost element in the 12 o'clock position, a circular band bearing quarter- and half-hour wording designations spaced thereon and visible through an arcuate cut-out in the uppermost element radially inwardly of the said arcuate cut-out in the 12 o'clock position, and a minute hand fixed in position thereon and extending radially outwardly from the axial mounting and movable with the element to point to a selected time and said minute hand being visible through the transparent portions the intermediate and uppermost elements, the intermediate element having equispaced around its peripheral portion each of the twelve hours in wording and differing by one hour from the preceding and succeeding wording and having its outer edge shaped for ease of manipulation, radially inwardly thereof pairs of radially aligned hourly time designating numerical indicia of which the inner one of each pair is one hour less than the outer one of each pair, the outer one of each pair being visible through the same arcuate 12 o'clock cut-out as the 00 to 30 numerals of the 00 to 55 numerals aforesaid and the inner one of each pair being visible through a 12 o'clock arcuate cut-out in the uppermost element radially between the two 12 o'clock arcuate cut-outs aforesaid, the hourly wording being visible through an arcuate cut-out in the uppermost element in the 6 o'clock position disposed radially outwardly of the aforesaid 6 o'clock cut-out through which are visible 5-minute time intervals indicia of the lowermost element, an hour hand fixed in position thereon and extending radially outwardly from the axial mounting and movable with the element to point to a selected time and said hour hand being visible through the transparent portion of the uppermost element, and the uppermost element being smaller in diameter than the lowermost and intermediate elements and the central transparent circular portion having circumferentially therearound numeral and radial line clock indicia to which said minute and hour hands point for time-telling, three radially spaced arcuate cut-outs in the 12 o'clock position through which are visible, depending on the setting of the three disc-shaped elements, a radially outer numerical hour indicium from the outer of the radial pairs of numerals on the intermediate element and one of the said 00 to 55 numerals from 00 to 30 of the lowermost element or a radially inner numerical hour indicium from the inner of the radial pairs of numerals on the intermediate element and one of the 00 to 55 numerals from 35 to 55, the other cut-out showing blank, and two radially spaced arcuate cut-outs in the 6 o'clock position through the outer of which is visible the hour in wording from the peripheral portion of the intermediate element and through the inner of which is visible a time-designation of the circular band of spaced 5-minute time interval wording of the lowermost element, and when the lowermost, intermediate and uppermost disc-shaped elements are correctly moved and set all visible time-designating indicia conform.

2. An educational device according to claim 1 in which the outer edge of the intermediate disc-shaped element is serrated.

References Cited
UNITED STATES PATENTS

| | | | |
|---|---|---|---|
| 2,130,966 | 10/1938 | Ross | 35—74 X |
| 2,172,450 | 9/1939 | Pitcher | 35—39 |
| 2,248,195 | 7/1941 | Prins | 35—39 UX |
| 2,655,739 | 10/1953 | Wilmington | 35—39 |
| 2,385,732 | 9/1945 | Redding | 35—39 X |
| 2,539,025 | 1/1951 | Lobb | 35—39 X |
| 2,560,647 | 7/1951 | Higgins | 35—74 |
| 3,147,557 | 9/1964 | Maris | 35—74 |
| 3,203,115 | 8/1965 | Friday | 35—39 |
| 3,210,866 | 10/1965 | Brunnelle | 35—74 |

FOREIGN PATENTS 567,606   2/1945   Great Britain.

JEROME SCHNALL, *Primary Examiner.*